June 12, 1951  R. M. MOORE  2,556,770
FADING ATTACHMENT FOR MOTION-PICTURE CAMERAS
Filed May 7, 1946  6 Sheets-Sheet 1

INVENTOR.
RICHARD M. MOORE
BY

June 12, 1951 R. M. MOORE 2,556,770
FADING ATTACHMENT FOR MOTION-PICTURE CAMERAS
Filed May 7, 1946 6 Sheets-Sheet 3

Fig. 3

INVENTOR.
RICHARD M. MOORE
BY

June 12, 1951 — R. M. MOORE — 2,556,770
FADING ATTACHMENT FOR MOTION-PICTURE CAMERAS
Filed May 7, 1946 — 6 Sheets-Sheet 4

INVENTOR.
RICHARD M. MOORE.
BY

Patented June 12, 1951

2,556,770

UNITED STATES PATENT OFFICE 2,556,770

FADING ATTACHMENT FOR MOTION-PICTURE CAMERAS

Richard M. Moore, Rochester, N. Y.

Application May 7, 1946, Serial No. 667,825

3 Claims. (Cl. 88—16)

My invention relates to an attachment for motion picture cameras, particularly the Kodak Cine-Special Movie camera, adapted to synchronize or mechanically couple the shutter operation with the camera drive.

Although the principles of my invention may be employed with any type of motion picture camera, it has been particularly designed for use with the Kodak Cine-Special camera as an attachment which may be applied thereto. The attachment may be applied to the camera housing without disturbing the camera per se so as to mechanically couple the drive thereof for presenting frames of film to the lens of the camera, with the camera shutter to thereby enable the production of synchronized fades, dissolves and cross-dissolves. The device of my invention is useful also in connection with the production of animated pictures.

An object of my invention is to provide a simple and sturdy attachment particularly for a Cine-Special Kodak camera for mechanically coupling the camera shutter with the camera drive to synchronize the operation of the shutter with the presentation of film frames to the lens for exposure.

Another object of my invention is to provide an attachment for a movie camera adapted to produce dissolves, cross-dissolves, fade-ins or fade-outs in absolute synchronism with the exposure of film frames.

Another object of my invention is to provide a synchronous motor drive for a Cine-Special Kodak camera together with a means for mechanically coupling the drive of the camera for presenting film frames to the lens for exposure, with the camera shutter whereby the synchronous motor is automatically cut out upon the completion of a fade-out.

Another object of my invention is to provide a Cine-Special Kodak camera with an attachment for synchronizing the operation of the shutter with the camera drive, together with means whereby the camera may be driven by the spring drive thereof or, if desired, a motor drive may be applied to the camera which, when used, is synchronized and co-ordinated in its operation with the camera shutter.

Still another object of my invention is to provide an attachment for a Cine-Special Kodak camera in which the camera shutter is mechanically coupled to the drive for presenting film frames to the lens for exposure and the camera shutter is also synchronized in its operation with a dual sound recorder.

My invention further contemplates the provision of an attachment for a Cine-Special Kodak camera in which, without opening the housing of the camera, an attachment may be applied thereto capable of performing fade-ins, fade-outs, or cross-dissolves in a varying number of film frames but in precise synchronism with the presentation of the frames to the camera lens for exposure.

Other objects and advantages of my invention will be particularly pointed out in the claims and will be apparent from the following description, when taken in connection with the accompanying drawings, in which:

While my invention has been shown as applied to a Cine-Special Kodak camera, it will be appreciated that the principles thereof may be incorporated for use in connection with other types of motor picture cameras. Since the construction and operation of a Cine-Special Kodak camera are well known in the art to which this invention applies, primarily only external views of the camera have been shown, together with such diagrammatic views of internal portions of the camera as are necessary to an understanding of the invention and which cooperate to provide the mechanical coupling of the camera shutter with the camera drive.

Figure 1:
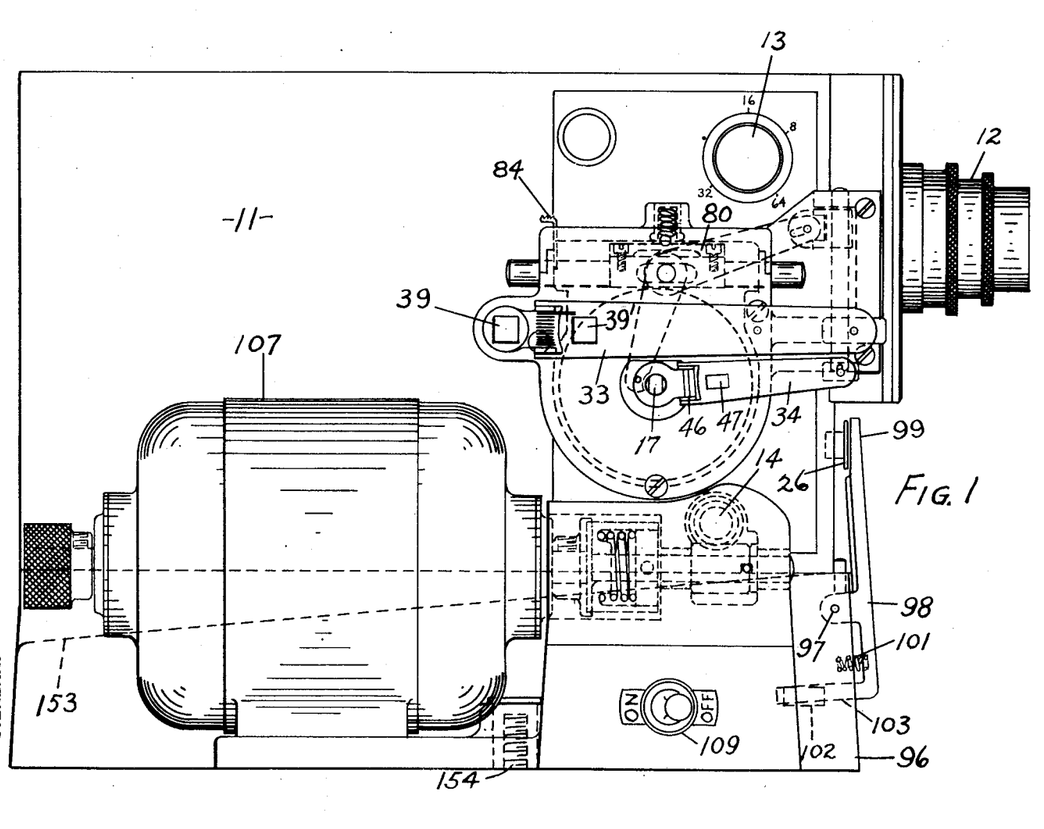
Fig. 1 is an external side elevation of a Cine-Special Kodak camera housing together with the camera lens and showing the synchronous motor drive and the shutter fading attachment which are applied to the camera housing.

As shown most clearly in Fig. 1, the camera comprises a housing or frame 11, a lens system indicated by the numeral 12, and means indicated diagrammatically at 13 for regulating the speed at which the film frames are presented for exposure to the camera lens. The camera further has a single frame shaft 14 for the reception of a motor drive, when desired. The camera as is also well known in the art has a single frame release 16 and an eight frame shaft 17. These shafts are accessible from the exterior of the camera housing and are driven whenever film is being presented to the camera lens.

Figure 5:
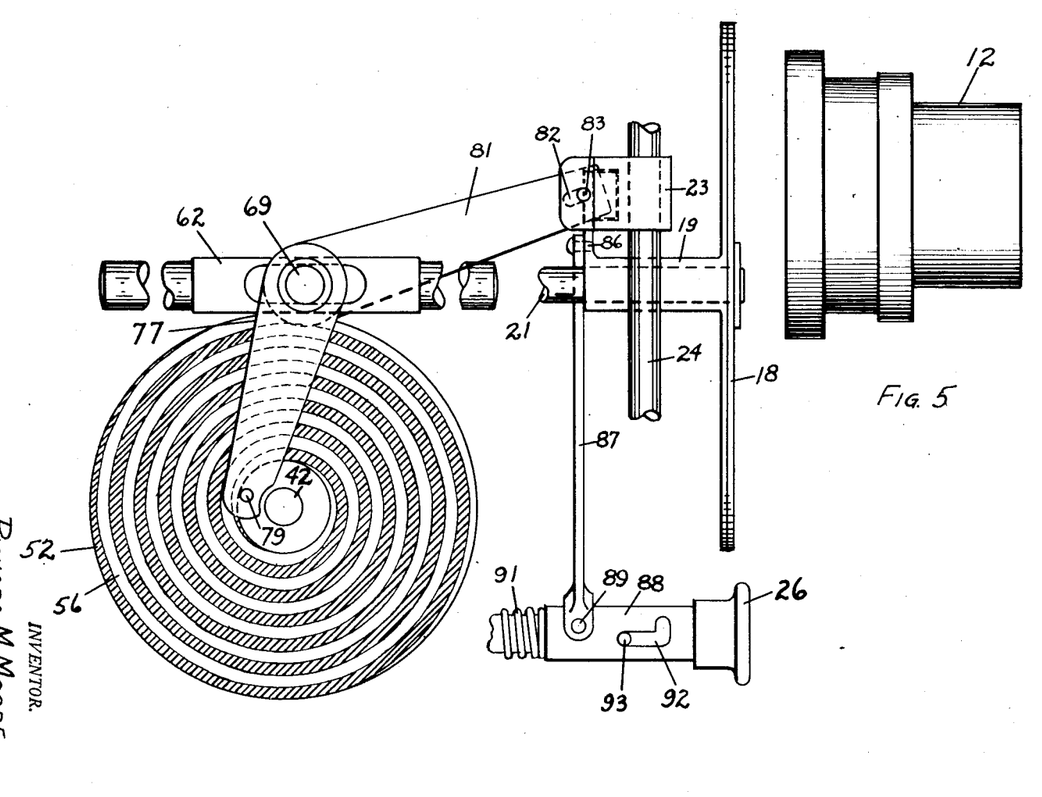
Fig. 5 is a side elevation showing one of the scrolls or cam tracks and the connection between the cam track and the shutter for operating the shutter in synchronism with the camera drive, the particular cam track shown being a fade-out cam track.

The camera is further provided with a shutter 18 which has been shown in Fig. 5, solely for purposes of illustration as of the rotating disc type wherein one of the blades is stationary and the other rotates with respect to it to open and close a gap between them.

As shown most clearly in Fig. 5, the rotating blade of the shutter is carried by a sleeve 19 which is rotatably supported on a shaft 21. The sleeve 19 is connected to a camera shutter lever 22, shown in dotted lines in Fig. 2.

The camera shutter lever 22 is connected by a suitable pivot arrangement to a fader lever block 23 shown most clearly in Fig. 5. The fader lever block is mounted so as to slide on two vertically extending rods or guide posts 24 (Figs. 2 and 5) carried by the camera housing. The camera is further provided with a starting button 26 by which the spring motor of the camera is controlled. Upon inward pressing of the starting button the spring motor of the camera is released to present film to the lens for exposure in accordance with the rate of speed for which the camera is set. The construction and operation of all the above parts are well known in the art to which this invention applies and it is believed that no further description is required for an understanding of my invention.

In the conventional Cine-Special Kodak camera, a member corresponding to the fader lever block is actuated manually to perform fade-ins, fade-outs and dissolves. Let us assume that it is the desire to make a fade-in. The fader lever block is then in the closed shutter position shown in Fig. 5. The photographer must then move the fader lever block downward on the guide rods 24 at a uniform rate of speed and at a speed in accordance with the number of film frames during which he desires to perform the fade-in. It is difficult, if not impossible, for the operator to so regulate the speed of his manual movement of the fader lever block so as to perform the fade-in operation in the number of frames desired. A similar difficulty occurs in connection with making fade-outs.

In making a cross-dissolve, the photographer must first make a fade-out by manually controlling the speed of movement of the lever-block, then back crank the film the same number of frames as were presented to the lens during the fade-out and then start the camera again and manually perform a fade-in operation. It will be appreciated that it is substantially impossible to perform the fade-out and the fade-in in the same number of frames by manually controlling speed of movement of the fader lever block. Therefore, it is substantially impossible for the photographer to pick up the film so as to perform the fade-in at the exact point on the film or the same film frame as that at which the fade-out was started. Moreover, it will be appreciated with the Cine-Special Kodak camera, because the shutter is manually controlled and not coordinated with the feeding of film to the lens, that the camera is not suited to the performance of animation work with fading in which a single frame at a time is presented to the camera lens.

With the fader attachment of my invention, the camera shutter is mechanically coupled or co-ordinated in synchronism with the speed at which film frames are presented to the camera lens for exposure. Moreover, the attachment of my invention may be applied to a Cine-Special Kodak camera without changing the camera structure and by employing the elements or operating means extending exteriorly from the camera without disturbing any of the working parts of the camera within the camera housing.

Figure 2:
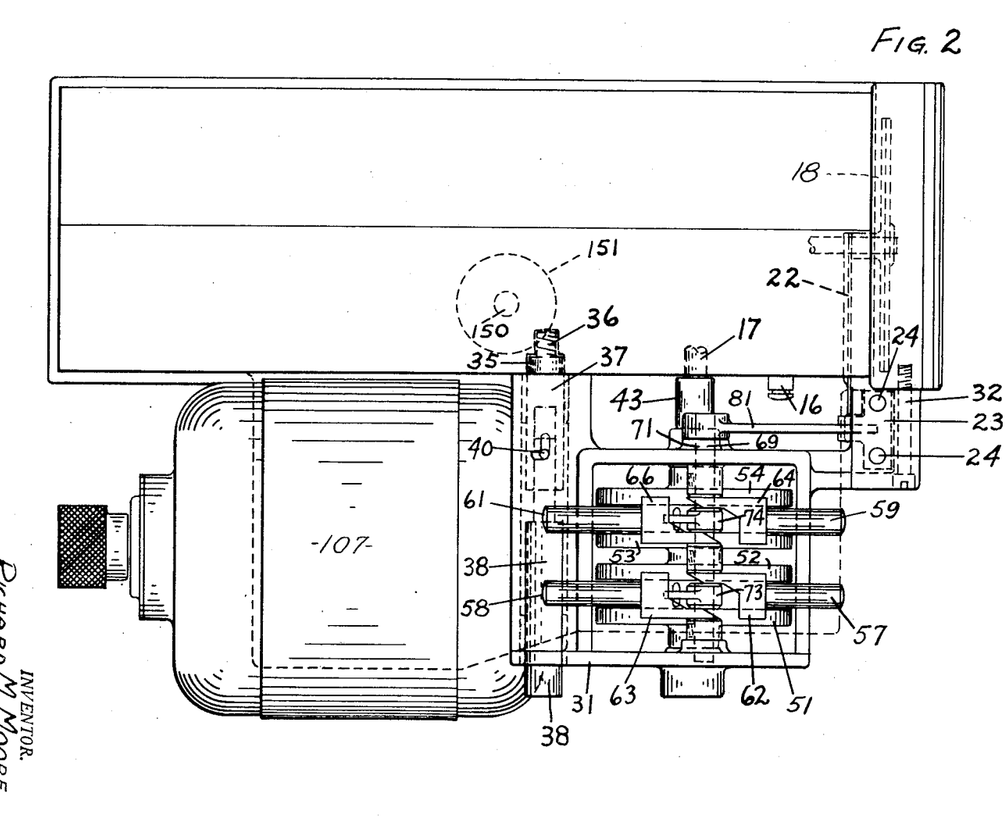
Fig. 2 is a top plan view of Fig. 1 parts of which are diagrammatic showing in particular the selective fading mechanism of my invention and indicating how the fader is attached to the camera housing.

The fader attachment (Fig. 2) comprises a housing 31 which is attached to the camera housing by means of suitable screws, one of which is shown at 32. To enable the attachment of the fader housing to the camera housing, the camera spring-winding crank 33 and the camera eight-frame crank 34 (see Fig. 1) are removed from their normal positions on their respective shafts extending from the camera housing. The spring winding shaft of the camera is indicated at 36 (Fig. 2). A bore extends through the fader housing 31 in which is carried suitable bushings. Extending through the bushings is an extension shaft comprising shaft elements 37 and 38. Shaft element 37 has a male end 35 which is threaded into the female end of the spring winding shaft 36 of the camera. The shaft element 38 has a portion of reduced diameter which fits into a bore in the shaft element 37. A pin and slot connection 40 between the shaft elements couples them together to permit the shaft element 38 to be shifted outward with respect to the shaft element 37 while still maintaining a driving connection between the parts. The purpose of this arrangement is to permit the winding crank to clear the adjacent parts during winding of the spring motor.

As shown most clearly in Fig. 1, on the squared end 39 of this shaft extension, the camera spring winding crank 33 normally found on the camera is applied. As is well known, the spring winding crank has a square opening 39' and a hinge between the square opening 39' and the squared end 39 of the shaft extension to enable the crank to be doubled back on itself and the square opening 39' slipped over the end of the shaft extension. The spring winding crank 33 therefore functions through the shaft extension precisely in the manner in which it would operate on the Cine-Special Kodak without my fader attachment.

Figure 3:
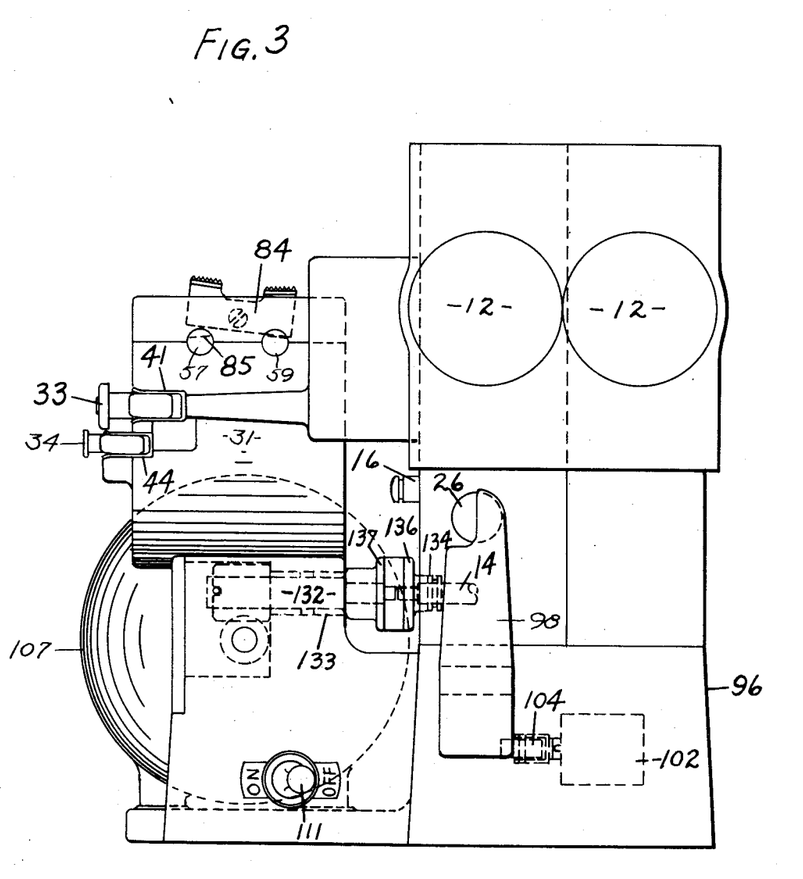
Fig. 3 is a front elevation of the camera with the fading attachment of my invention and motor drive applied thereto.

As shown most clearly in Fig. 3, a spring clip 41 is mounted on the wall of the fader attachment for the reception of the handle of the spring winding crank. As in the Cine-Special Kodak, the spring winding crank is arranged so that when not in use, it may be folded back from its normal winding position so as to be retained in the spring clip 41. Since the construction and operation of the spring winding crank and the spring motor of the camera are well known in the art, it is believed that no further description of these parts is necessary.

As previously mentioned, accessible from the exterior of the camera is a eight-frame shaft 17 (Fig. 2). This shaft in the conventional Cine-Special Kodak camera carries the camera eight-frame crank 34 (Fig. 1). This eight-frame crank is removed from the camera and a shaft 42 is coupled to the eight-frame shaft 17 (Fig. 2) by means of a coupling indicated at 43.

The extension shaft 42 (Fig. 1) is arranged and coupled to the eight-frame shaft 17 so that at all times when the camera is in operation and the eight-frame shaft 17 is therefore rotating, the shaft 42 (Fig. 1) is rotating. A spring clip 44 (Fig. 3) is carried by the fader housing for holding the eight-frame crank in non-operating position. The construction and operation of the eight-frame crank 34 (Fig. 1) is the same as on the Cine-Special Kodak. It has a hinge at 46 and a rectangular slot at 47. By this arrangement, the crank may be folded back upon itself so that the rectangular opening 47 may be applied to the end of this shaft 42, the shaft end having flat sides for the reception of the rectangular opening 47. By means of the eight-frame crank, the eight-frame shaft may be back cranked as is well known in the art and the purpose of which will later appear.

The eight-frame shaft extension 42 is carried by the fader housing 31, extends therethrough and is suitably supported in bearings. The shaft 42 carries rigidly secured thereto a plurality of scrolls 51, 52, 53, and 54 (see Fig. 2). In Fig. 5 I have shown one of the scrolls, the particular scroll shown being the fade-out scroll 52. In the position of the parts shown in Fig. 5, the scroll has actuated the parts so as to perform a fade-out in which position, the fader lever block 23 is up and the camera shutter is closed.

Each of the scrolls comprises spirally arranged cam track or groove 56. The cam groove actuates a pin or follower as the shaft 42 is rotated, as will presently appear. The scrolls 51 and 52 (Fig. 2) are identical except that the scrolls face each other which reverses the direction in which the follower will be actuated as is obvious.

The cam track of each of the scrolls 51 and 52 has six turns so that the eight-frame shaft extension 42 must rotate six complete turns before the pin or follower, which is actuated by the scroll, is shifted across a radius of the scroll from an external position to the position shown in Fig. 5. Thus 48 frames are presented to the camera lens for exposure during the time interval during which the shutter is moving from an open position to the closed position shown in Fig. 5. Similarly when the parts are arranged so that the fade-in scroll 51 is effective, 48 frames are presented to the camera lens for exposure during the time interval when the shutter is opening, and the fader lever block is moving from the position shown in Fig. 5 to its down position.

The scrolls 53 and 54 (Fig. 2) face each other and are similarly complementary. However, each of these scrolls has a cam track with eight spirally arranged turns so that a fade-in or fade-out is performed during eight rotations of the eight-frame shaft 17. Thus a fade-in or a fade-out is accomplished during the presentation of 64 frames to the camera lens.

In Fig. 2, I have shown a plurality of control buttons, 57, 58, 59 and 61. Each pair of control buttons 57 and 58, and 59 and 61 is a continuous rod which extends through openings formed on each side of the casing so as to be accessible from the exterior thereof. Control button 57 is a fade-in control while control button 58 is the fade-out control for the 48-frame fader. Similarly, control button 59 is the fade-in control and control button 61 the fade-out control for the 64-frame fader.

Upon pushing the fade-in control button 57 to the left, as viewed in Fig. 2, since the control buttons 57 and 58 are part of an integral rod, the control button 58 is moved out or to the left, as viewed in Fig. 2. The control buttons 59 and 61 operate in a similar manner. Carried by the control buttons is a plurality of shift-over cams 62, 63, 64 and 66. These shift-over cams are fixed with respect to the control buttons so as to be actuated thereby.

Figure 4A:
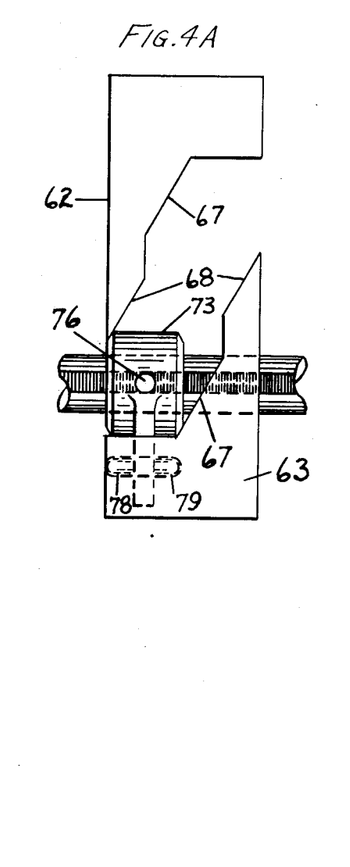
Figs. 4A, 4B, 4C are views somewhat diagrammatic showing how the selectors of my novel fading mechanism are operated.
Figure 4B:
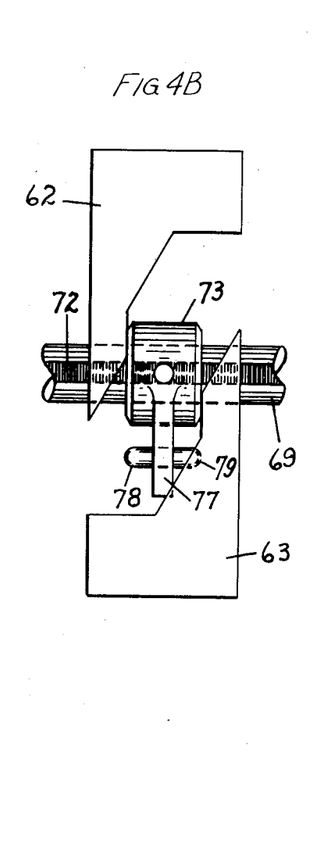
Figure 4C:
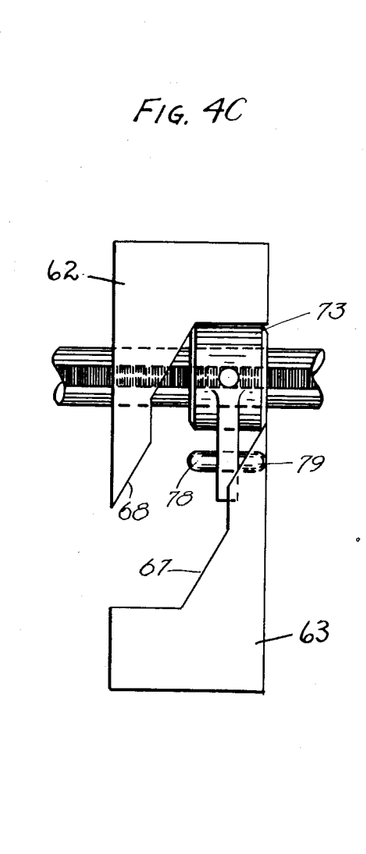

In Fig. 4, I have shown the shift-over cams 62 and 63. Since this set of shift-over cams is identical with the shift-over cams 64 and 66, a description of one set of cams will suffice. In Fig. 4, the control buttons have been omitted for the purpose of clarity of the drawings. Further, for the same reason, the scrolls have been omitted, but it will be understood, as shown in Fig. 2, that the scrolls lie adjacent the sides of the shift-over cams. Each of the shift-over cams includes a shift-in cam part 67 and a shift-out cam part 68.

Carried by and journaled in the frame of the fader is a shaft 69 which projects from the fader housing as shown at 71 (Fig. 2). As shown most clearly in Fig. 4, milled in the shaft 69 is a keyway 72 which preferably extends throughout most of that portion of the shaft which lies within the fader housing. As shown in Fig. 2, mounted on the shaft 69, are a pair of shift collars 73 and 74 which are shiftable along the shaft 69 upon being engaged respectively by the shift-over cams 62, 63 and 64 and 66. Each of the collars has a pin 76 (Fig. 4) slideable in the milled key-way 72.

Each of the shift collars carries a lever arm 77 which has pins or selectors 78 and 79 extending sidewardly therefrom. Upon actuation of the shift collars by the shift-over cams, the pins are selectively movable into engagement with the scrolls. In Fig. 5, for example, I have shown the pin 79 in engagement with the cam groove 56 of the scroll 52.

In the center of Fig. 4, I have shown the parts of the 48-frame fader in a neutral position with the shift-over cams retaining the shift collar in a neutral position. At the right side of Fig. 4, the fade-in control button 57 has been pushed inward, the cam surface 68 withdrawn and the cam surfaces 67 of the shift-over cam 62 has shifted the shift collar to the right so as to engage the pin 79 with the cam groove of the scroll 51. As presently will appear, when shifted into this position, a fade-in is performed.

When it is desired to restore the parts to a neutral position, the control button 58 is pushed inward so as to actuate the shift-over cam 63 to cause the cam surface 68 to actuate the shift collar 73 and restore the parts to the neutral position shown at the center of Fig. 4. At the left of Fig. 4, I have shown the parts in the position which they occupy when the control button 58 is actuated so as to move the shift collar to the left along the shaft 69 and engage the pin 78 with the scroll 52 (Fig. 2). This is the position of the parts shown in Fig. 5 with the parts being shown in the position which they occupy at the end of a fade-out.

As shown at 80 in Fig. 1, a bridge extends across each pair of shift-over cams. Each bridge has three spherical depressions adapted to receive a spring pressed ball adapted to hold the shift-over cams in a selected position for neutral, fade-in or fade-out. A fader safety lock 84 is provided (Fig. 1) which is pivoted on the fader casing (Fig. 3). Each of the fader control buttons 58 and 61 (Fig. 2) has a slot 85 (Fig. 3). By pivoting the safety lock, it may be engaged with either slot to lock either the 48 or 64-frame fader mechanism. This prevents accidental performance of, for example, a fade-out in 48 frames and the accidental pushing of the wrong button to perform the fade-in in 64 frames.

As shown most clearly in Figs. 2 and 5, mounted on the projecting end of the shaft 69 and rigidly secured thereto is a fader shutter lever 81. The fader shutter lever at the end thereof has a slot 82 (Fig. 5) adapted to receive a pin 83. The fader lever block 23 has a slot therein for the reception of the fader shutter lever 81 and a bore for the reception of the pin 83. By means of the pin and slot connection between the fader shutter lever and the fader lever block 23, the circular motion of the end of the fader shutter lever is converted to a straight line motion of the fader lever block 23 on the guide rods 24.

It will now be appreciated, since the eight-frame shaft 17 is rotating at all times when frames are being presented to the lens of the camera for exposure, that a fade-out can be performed in 48 frames by shifting the control button 58 (Fig. 2) so as to position the parts as shown at the left in Fig. 4. Similarly, a fade-out can be performed in 64 frames upon actuation of the control button 61 (Fig. 2). A fade-in can be performed in 48 or 64 frames depending upon which of the control buttons 57 and 59 is actuated.

It will thus be appreciated that the camera shutter is mechanically coupled to the feeding mechanism for the film so that a fade-in or a fade-out may be performed in a definite number of frames. Moreover, after a fade-out has been completed and cam 62 and 63 has been neutralized as shown in center drawing of Fig. 4, the eight-frame shaft may be back cranked by the crank 34 the proper number of frames and a cross-dissolve performed, with the fade-in being picked up at the same frame as the fade-out was started.

Referring now to Fig. 5, the shutter sleeve 19 has pivotly secured thereto, as shown at 86, a lever 87. The end of the lever 87 is bifurcated. The bifurcated end of the lever 87 is pivotly pinned to a flat blade 88 as shown at 89. The flat blade 88 is secured to the camera starting and stopping button 26, a spring 91 normally urging the parts to the right as viewed in Fig. 5. The flat blade 88 has an L-shaped slot 92 through which extends a fixed pin 93. When the shutter moves toward a closed position, the lever 87 is actuated to raise the flat blade 88 and permit the spring 91 to snap the starting button 26 up and out and thereby stop the camera feed mechanism as will presently appear.

As shown most clearly in Figs. 1 and 3, a casting 96 is provided upon which the camera housing is mounted. Pivoted at 97 to the frame 96 is a lever 98 which has an upper end 99 adapted to be engaged by the control button 26 when it snaps outward. A spring 101 seated in a bore in the frame normally urges the lever 98 in a counterclockwise direction, as viewed in Fig. 1, into a position to be engaged by the starting and stopping button 26. The base casting carries a micro-switch which has been diagrammatically illustrated at 102 in dotted lines. The lever 98 has a tail piece 103 which projects inward to a position to actuate one of the contacts of the micro-switch, as diagrammatically illustrated at 104.

Figure 6:
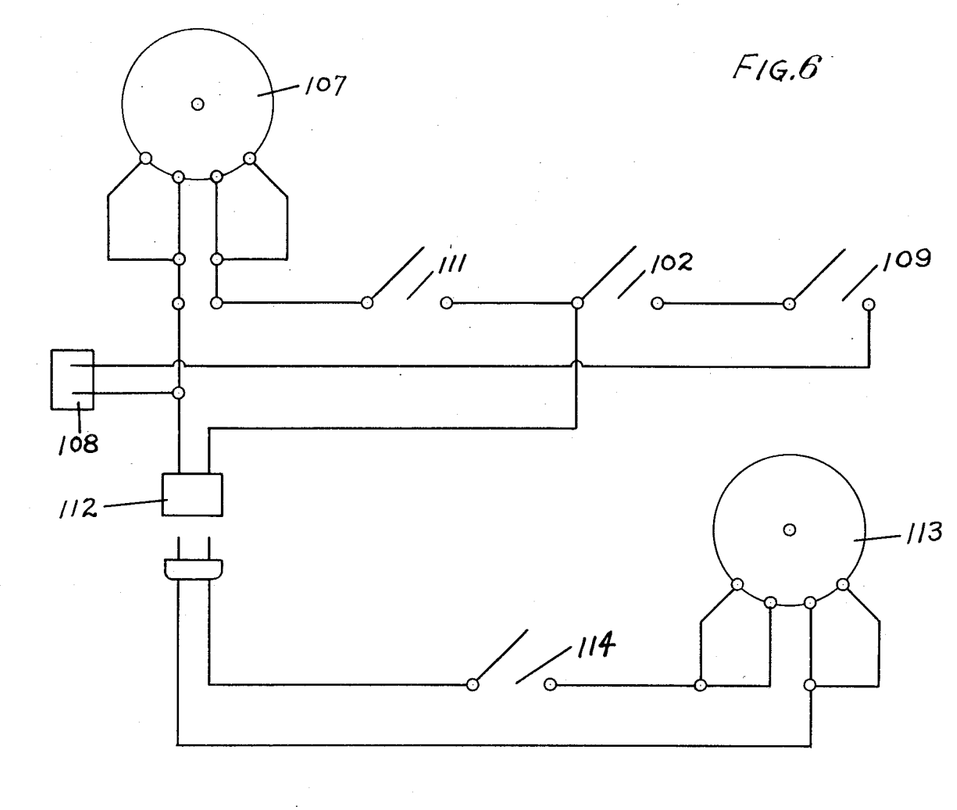
Fig. 6 is a circuit diagram showing how the camera drive and the recorder drive are hooked up with the automatic fader shutter control of my invention.

Mounted on the casting 96 is a synchronous motor 107 which is adapted to drive the camera drive shaft 14 (Fig. 3) as will presently appear. In Fig. 6 I have shown the circuit diagram for the synchronous motor 107 together with the control switches thereof. A circuit is connected to a source of current as diagrammatically illustrated at 108. Interposed in the circuit to the synchronous motor is a side switch 109, the micro-switch 102, and a front switch 111. The side switch 109 is shown in Fig. 1 and the front switch 111 in Fig. 3. In Fig. 6 I have also diagrammatically illustrated a recorder circuit which may be plugged into the camera circuit by means of an outlet 112. The recorder is driven by a synchronous motor 113 which rotates at the same speed as the synchronous motor 107. The recorder circuit includes a recorder switch 114 by which the recorder may be connected and disconnected independently of the camera operation.

As will be apparent from Fig. 6, when the front switch 111 is open, the circuit to the camera synchronous motor is open and assuming the other switches are closed, the recorder synchronous motor will continue to operate. When either the side switch 109 or the micro-switch 102 is open the circuits to both synchronous motors 107 and 113 are open. Upon completion of a fade-out resulting in actuation of the micro-switch, the recorder synchronous motor is automatically cut out whereby the recorder is co-ordinated with the synchronized operation of the film feed and the shutter. Similarly upon pressing the starting button 26 (Fig. 1) inward, the tail piece 103 of the lever 98 is retracted to permit the micro-switch to close and both motors are started.

The bottom of the Cine-Special Kodak camera housing has a threaded opening 150 for the reception of a tripod screw. A thumb screw 151 is provided, as shown in Fig. 2, which extends through the base casting upon which the motor is mounted, and is threaded into the opening 150 in the bottom of the camera housing. When the camera is used directly on the tripod without the motor drive base, threaded opening 150 is connected directly with the mounting tripod screw. However, when the motor drive base is used with the camera, it is necessary to use an additional female mounting screw (#154, Fig. 1) between the motor drive casting 96 and the tripod. Thus the motor, the camera and the fading mechanism are for practical purposes a self-contained unit. As shown at 153 (Fig. 1), the casting upon which the motor is mounted has an inclined plane surface which permits the film magazine of the camera to be unlatched from the camera housing and dropped downward for removal from the camera.

It is believed that the functioning and operation of the fader and motor drive of my invention will be apparent from the foregoing. It will also be clear that various changes and modifications may be made, particularly in the form and relation of parts, without departing from the spirit of my invention as set forth in the appended claims.

I claim:

1. In a motion picture camera having a shutter, a shaft having connections to the camera drive whereby it is driven in synchronism with the presentation of frames to the camera lens, a pair of circular elements mounted on said shaft and driven thereby, each of said elements having a spiral groove therein with the spiral grooves facing each other, a selector manually movable into either of said spiral grooves, said selector being movable radially of said circular element when the selector is in the groove of one of said elements, and means interconnecting said selector with the camera shutter for opening or closing the shutter depending upon which of said elements is engaged by said selector.

2. In a motion picture camera having a shutter, a shaft having connections to the camera drive whereby it is driven in synchronism with the presentation of frames to the camera lens, a pair of circular elements mounted on said shaft and driven thereby, said elements each having a spiral actuator track in the face thereof, a selector manually movable into engagement with the actuator track of either of said elements, said selector being movable from one position to another when engaged with one of said tracks and being returnable to its starting position when engaged with the other track, and means interconnecting the selector with the camera shutter for opening or closing the shutter depending upon which of said elements is engaged by said selector.

3. In a motion picture camera having a shutter, a shaft having connections to the camera drive whereby it is driven in synchronism with the presentation of frames to the camera lens, a pair of selectors, means comprising two pairs of circular discs each having spiral grooves formed therein carried by said shaft for actuating said selectors, means interconnecting said selectors with the camera shutter for opening or closing the shutter, one of said pairs of actuating means having a greater number of spiral grooves than the other pair so that one selector may be operated at one rate of speed and the other selector at another rate of speed, and means for manually engaging one selector or the other with said actuating means.

RICHARD M. MOORE.

REFERENCES CITED

The following references are of record in the file of this patent:

UNITED STATES PATENTS

| Number | Name | Date |
| --- | --- | --- |
| 1,275,863 | Davis | Aug. 13, 1918 |
| 1,404,404 | Pittman | Jan. 24, 1922 |
| 1,409,980 | Uhler | Mar. 21, 1922 |
| 1,417,005 | Wescott | May 23, 1922 |
| 2,083,646 | Fuller | June 15, 1937 |
| 2,088,715 | Mitchell | Aug. 3, 1937 |
| 2,117,694 | Becker | May 17, 1938 |
| 2,376,301 | Widmer | May 15, 1945 |

FOREIGN PATENTS

| Number | Country | Date |
| --- | --- | --- |
| 521,150 | Great Britain | May 14, 1940 |
| 524,543 | Great Britain | Aug. 8, 1940 |